Figure 1:
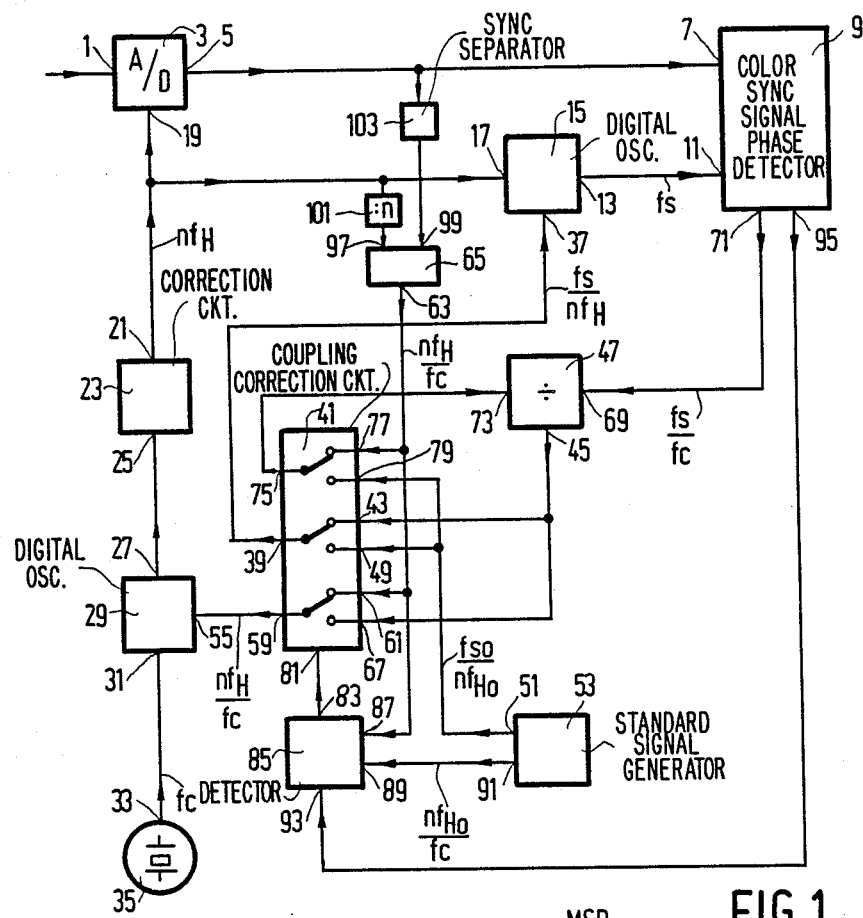

United States Patent [19]

Nillesen

[11] Patent Number: 4,897,713
[45] Date of Patent: Jan. 30, 1990

[54] COLOR TELEVISION SIGNAL DECODING CIRCUIT

[75] Inventor: Antonius H. Nillesen, Eindhoven, Netherlands

[73] Assignee: U. S. Philips Corporation, New York, N.Y.

[21] Appl. No.: 301,572

[22] Filed: Jan. 24, 1989

[30] Foreign Application Priority Data

Feb. 10, 1988 [NL] Netherlands ............. 8800320

[51] Int. Cl.⁴ .............. H04N 5/04; H04N 9/44; H04N 9/66
[52] U.S. Cl. .......................... 358/17; 358/23
[58] Field of Search ............. 358/17, 18, 37, 23, 358/13, 21 R

[56] References Cited

U.S. PATENT DOCUMENTS 4,625,232 11/1986 Nillesen .................... 358/23
4,626,914 12/1986 Breimer .................... 358/17
4,689,664 8/1987 Moring ..................... 358/23

Primary Examiner—Tommy P. Chin
Attorney, Agent, or Firm—Edward W. Goodman

[57] ABSTRACT

In a color television signal decoding circuit having a first phase-locked loop comprising a color synchronizing signal phase detection circuit (9) for a first digital oscillator (15) which supplies reference signals for demodulating a digital chrominance signal, and a second phase-locked loop comprising a line synchronizing signal phase detection circuit (65) for a second digital oscillator (29) which supplies a clock signal having a frequency coupled to the line frequency for an analog-to-digital converter (3) and for the first digital oscillator (15), the first phase-locked loop and a coupling (73, 45, 37) between the two loops is interrupted (41) when a stable synchronization state of the second phase-locked loop is detected (85), while a new phase-locked loop for the second digital oscillator (29) is formed which is then controlled (59, 67, 121, 71) by the color synchronizing signal phase detection circuit (9) so that further signal operations of the decoded signals can be performed with greater accuracy.

4 Claims, 2 Drawing Sheets

COLOR TELEVISION SIGNAL DECODING CIRCUIT

The invention relates to a color television signal decoding circuit comprising an analog-to-digital converter having an input for a video signal and an output which is coupled to a first input of a color synchronizing signal phase detection circuit a second input of which is coupled to an output of a first digital oscillator having a clock signal input which, likewise as a clock signal input of the analog-to-digital converter, is coupled to an output of a second digital oscillator which is controllable by means of a clock signal having a stable frequency, a control signal input of the first digital oscillator being coupled to a control signal output of the color synchronizing signal phase detection circuit, a control signal input of the second digital oscillator being coupled to a control signal output of a line synchronizing signal phase detection circuit which is also coupled to the control signal input of the first digital oscillator, and inputs of the line synchronizing signal phase detection circuit being coupled to outputs of the analog-to-digital converter and of the second digital oscillator for receiving signals at the line frequency of the video signal.

A decoding circuit of this type, which is known from European Patent Specification 0,111,981, is suitable for decoding color television signals having both a fixed and a variable ratio between the line frequency and the chrominance subcarrier frequency of this color television signal.

When processing color television signals which have been decoded by such a decoding circuit and which have a fixed ratio between the line frequency and the chrominance subcarrier frequency, minor position errors are found to be produced between memory information to be written and to be read when using memories for, for example, filtering, noise suppression or field number conversion, whose write and read clock frequencies are in a fixed ratio. Consequently, such signal processing operations may be less accurate.

It is an object of the invention to realize more accurate signal processing operations.

To this end a color television signal decoding circuit of the type described in the opening paragraph is characterized in that the control signal output of the line synchronizing signal phase detection circuit is coupled to an input of a stable state detection circuit for detecting a stable synchronization state, said stable state detection circuit having an output which is coupled to an operation signal input of a coupling correction circuit for realizing, in the stable synchronization state, a coupling between the control signal output of the color synchronizing signal phase detection circuit and the control signal input of the second digital oscillator and a coupling between the control signal input of the first digital oscillator and an output of a standard signal generating circuit, and for realizing a decoupling between the control signal output of the line synchronizing signal phase detection circuit and the control signal inputs of the first and the second digital oscillator.

In the stable synchronization state of the line synchronizing signal phase detection circuit, i.e. the state at which the said fixed ratio occurs between the line frequency and the chrominance subcarrier frequency, this measure eliminates the influence of this line synchronizing signal phase detection circuit on the control of the two digital oscillators and only the second digital oscillator is controlled by the color synchronizing signal phase detection circuit. Noise and interference in the line synchronizing signal then no longer have any influence on the digital oscillators so that they are found to be operating more accurately and the decoded color television signals can be processed more accurately.

Figure 2:
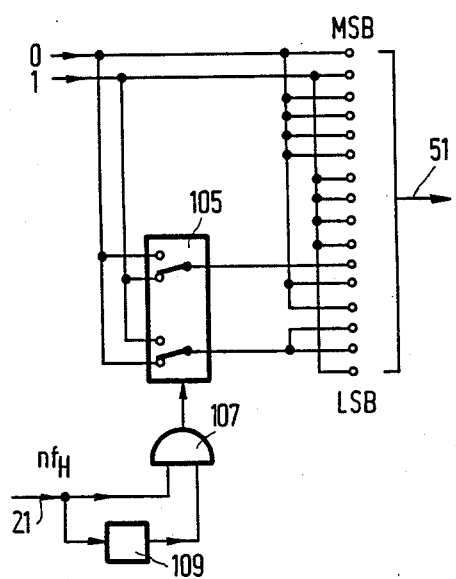
Figure 3:
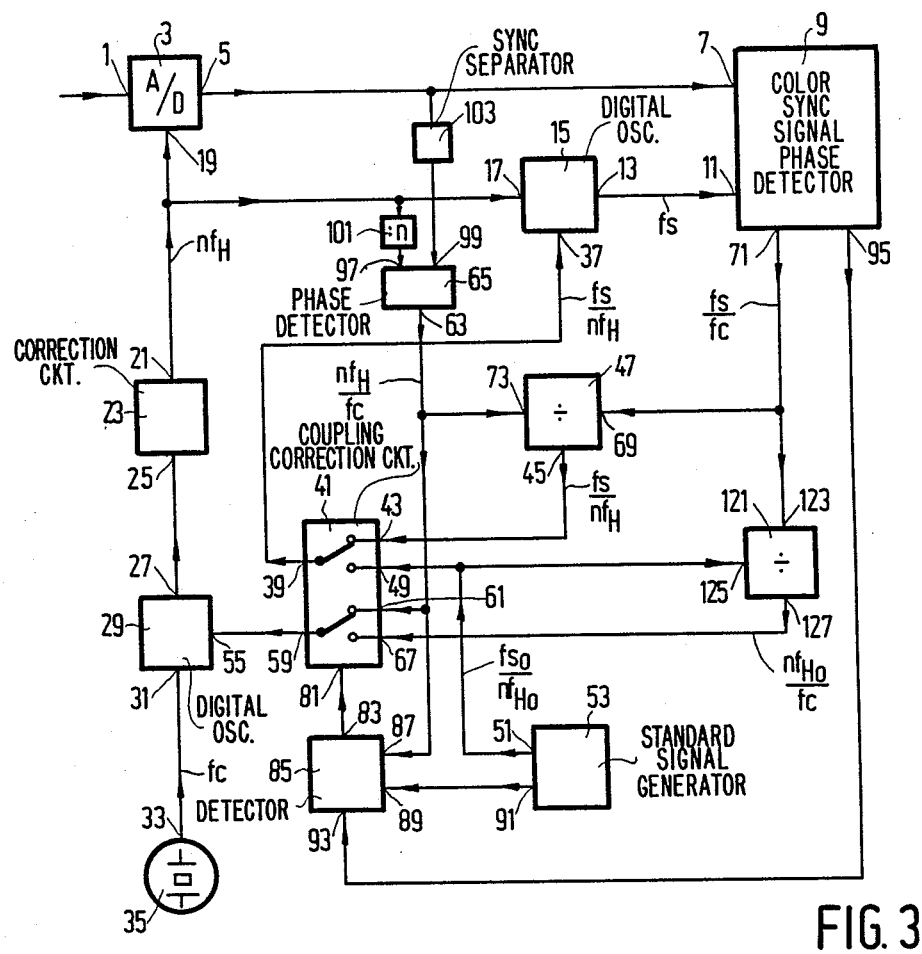
Figure 4:
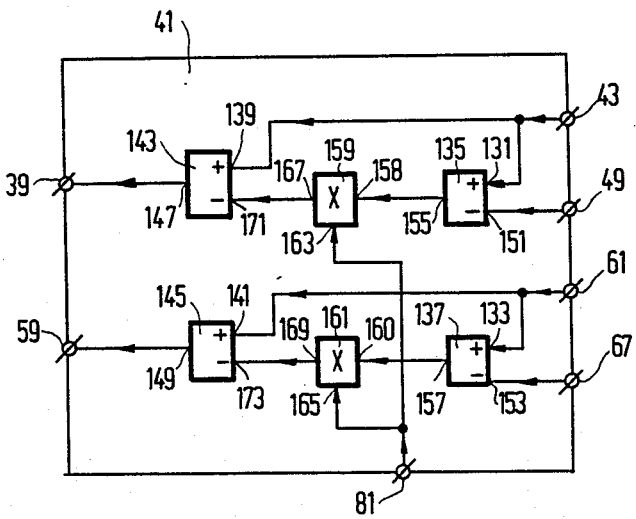

The invention will now be described in greater detail, by way of example, with reference to the accompanying drawings in which FIG. 1 is a concise block diagram of a possible embodiment of a color television signal decoding circuit according to the invention, FIG. 2 is a more detailed circuit diagram of a part of a standard signal generating circuit for an NTSC version of a color television decoding circuit according to the invention, FIG. 3 is a concise block diagram of another possible embodiment of a color television signal decoding circuit according to the invention, and FIG. 4 is a block diagram of a possible embodiment of a coupling correction circuit for the embodiment of FIG. 3.

In FIG. 1 a video signal comprising a luminance signal, synchronizing signals and a chrominance signal is applied to an input 1 of an analog-to-digital converter 3.

A digitized video signal whose color synchronizing signal of the chrominance signal is applied to a first input 7 of a color synchronizing signal phase detection circuit 9 is obtained from an output 5 of the A/D converter 3.

For the sake of clarity the signal paths for the digital signals are shown in a single form and the Figure does not include separation circuits for the different parts of the digitized video signal, which circuits are not important for understanding the invention.

A second input 11 of the color synchronizing signal phase detection circuit 9 receives a reference signal at the chrominance subcarrier frequency $f_s$ of the chrominance signal from an output 13 of a first digital oscillator 15.

A clock signal input 17 of the first digital oscillator 15 and a clock signal input 19 of the A/D converter 3 are connected to an output 21 of a waveform correction circuit 23 an input 25 of which is connected to an output 27 of a second digital oscillator 29. These clock signal inputs 17, 19 receive a clock signal at a frequency of n times the line frequency, hence $nf_H$. A clock signal input 31 of the second digital oscillator 29 receives a clock signal at a frequency $f_c$ from an output 33 of a stable oscillator 35 in the form of a crystal oscillator.

The output signals of the A/D converter 3 and of the first digital oscillator 15 are sampled at the frequency $nf_H$ of the clock signal supplied by the second digital oscillator 29 and the waveform correction circuit 23 so that the output signal of the first digital oscillator 15 can be used for demodulating the chrominance signal of the digitized video signal.

A control signal input 37 of the first digital oscillator 15 receives a digital signal combination having a value of $$\frac{f_s}{nf_H}$$

from a first output 39 of a coupling correction circuit 41. In the shown state of the coupling correction circuit 41 this signal combination originates from a first input 43 thereof which is connected to an output 45 of a first divider circuit 47 and which is controlled via this divider circuit 47. In the non-shown state of the coupling correction circuit this signal combination originates from a second input 49 thereof which is connected to an output 51 of a standard signal generating circuit 53 and then has a constant value $$\frac{f_{so}}{nf_{Ho}}$$

the reference $f_{so}$ denoting the standard subcarrier frequency and the reference $f_{Ho}$ denoting the standard line frequency.

A control signal input 55 of the second digital oscillator 29 is connected to a second output 59 of the coupling correction circuit 41 and receives a digital signal combination having a value of $$\frac{nf_H}{f_c}.$$

In the shown state of the coupling correction circuit 41 this signal combination originates from a third input 61 thereof which is connected to a control signal output 63 of a line synchronizing signal phase detection circuit 65. This signal combination is then controlled by this line synchronizing signal phase detection circuit 65. In the non-shown state of the coupling correction circuit 41 this signal combination originates from a fourth input 67 thereof which is connected to the output 45 of the first divider circuit 47. This signal combination is then controlled via this first divider circuit 47.

Each digital oscillator 15, 29 may be formed with a modulo-one-adder an input of which is connected via a memory circuit to the relevant control signal input and another input of which is connected to an output of a delay circuit controlled by the relevant clock signal, which delay circuit has a delay of one period of the relevant clock signal, while the output of the modulo-one-adder is connected to the input of the delay circuit. The frequency of the output signal of such a digital oscillator is equal to the product of the value of the digital signal combination at the control signal input and the clock frequency. Its output signal is a signal sampled at the relevant clock signal frequency.

The divider circuit 47 receives a controllable digital signal combination having a value of $$\frac{f_s}{f_c}$$

at an input 69, which is connected to a control signal output 71 of the color synchronizing signal phase detection circuit 9. A further input 73 of the divider circuit 47 is connected to a third output 75 of the coupling correction circuit 41 and in the shown state of the coupling correction circuit 41 it receives the controllable digital signal combination having the value of $$\frac{nf_H}{f_c}$$

from a fifth input 77 which is connected to the output 63 of the line synchronizing signal phase detection circuit 65. In the non-shown state of the coupling correction circuit 41 the third output 75 of the coupling correction circuit 41 receives the constant digital signal combination $$\frac{f_{so}}{nf_{Ho}}$$

from a sixth input 79 thereof, which is connected to the output 51 of the standard signal generating circuit 53.

As a result, the divider circuit 47 supplies at its output 45 a digital signal combination of the value $$\frac{f_s}{f_c} : \frac{nf_H}{f_c} = \frac{f_s}{nf_H}$$

in the shown state of the coupling correction circuit 41 and a digital signal combination of the value $$\frac{f_s}{f_c} : \frac{f_{so}}{nf_H} = \frac{nf_H}{f_c} \cdot \frac{f_s}{f_{so}}$$

in the non-shown state of the coupling correction circuit 41. The non-shown state of the coupling correction circuit 41 occurs when $f_s = f_{so}$ so that this value is then $$\frac{nf_H}{f_c}.$$

The second digital oscillator 29 is then controlled by the color synchronizing signal phase detection circuit 9 via the first divider circuit 47, while the first digital oscillator 15 is not controlled and operates at its standard frequency.

The non-shown state of the coupling correction circuit 41 is brought about by an operation signal applied to an operation signal input 81 and originating from an output 83 of a stable state detection circuit 85. This operation signal occurs when an input 87 of the stable state detection circuit 85 connected to the output 63 of the line synchronizing phase detection circuit 65 has, on an average, the same digital signal combination for some time as an input 89 thereof. The digital signal combination applied to the input 89 originates from an output 91 of the standard signal generating circuit 53 and has the value $$\frac{nf_{Ho}}{f_c}.$$

Furthermore, a color killer signal applied to an input 93 of the coupling correction circuit 85 and originating from an output 95 of the color synchronizing signal phase detection circuit 9 must indicate that a color synchronizing signal of the correct frequency and phase is received by the color synchronizing signal phase detection circuit 9.

The line sychronizing phase detection circuit 65 supplies from its output 63 the digital signal combination of the value $$\frac{nf_H}{f_c}$$

as a result of a phase comparison of two line frequency signals applied to inputs 97 and 99 thereof. The signal applied to the input 97 is obtained via a frequency divider 101 having a divisor of n from the clock signal occurring at the output 21 of the waveform correction circuit 23. A line synchronizing signal which is derived from the signal at the output 5 of the A/D converter 3 via a synchronizing signal separating circuit 103 is applied to the input 99.

The operation of the decoding circuit without the coupling correction circuit 41 is described in greater detail in European Patent Specification 0,111,981 which is herein incorporated by reference.

If desired, the coupling correction circuit 41 may be formed differently, for example, its fifth input 77 may be connected to the second output 59 of the coupling correction circuit 41 instead of to the output 63 of the line synchronizing signal phase detection circuit 65, or its third input 61 may be connected to the third output 75 of the coupling correction circuit 41 instead of to the output 63 of the line synchronizing signal phase detection circuit 65.

It is also possible to connect the third input 67 to a third output of the color synchronizing signal phase detection circuit 9 instead of to the output 45 of the divider circuit 47, if it is adapted to supply a digital signal combination of the value $$\frac{nf_H}{f_c}$$

at this third output. The switch-over of the signal at the input 73 of the first divider circuit 47 by means of the third output 75 and the fifth and the sixth input 77, 79 of the coupling correction circuit 41 can then be dispensed with.

The digital signal combination of the value $$\frac{nf_{H_o}}{f_c}.$$

which appears at the output 91 of the standard signal generating circuit 53 can generally be obtained in a simple manner because the frequence $f_c$ can be suitably chosen and because a possible small deviation in the circuit can be taken into account.

If desired, the digital signal combination $$\frac{f_{so}}{nf_{H_o}}$$

can be derived by means of the clock signal $nf_H$ in a manner indicated in, for example, FIG. 2.

Although the clock signal $nf_H$ may have a variable frequency, its frequency is constant if the standard signal $$\frac{f_{so}}{nf_{H_o}}$$

at the output 51 of the standard signal generating circuit 53 must be used, as will then be established by the stable state detection circuit 85, which circuit in that case only brings the coupling correction circuit 41 to the state which is not shown.

The sixteen-bit output combination 51 of the standard signal generating circuit 53 shown in FIG. 2 gives the value 0100001111100001 in the shown state of a change-over switch 105 and the value 0100001111000111 in the state which is not shown. These binary values correspond to the decimal numbers 17377 and 17351=17377−26.

The change-over switch 105 is operated by the output signal of an AND-gate 107 an input of which receives the clock signal of the frequency $nf_H$ in which n is chosen to be 858 and another input of which receives the output signal of a frequency divider 109 which divides the frequency of the clock signal by 858 and each time supplies a pulse per line period with a duration corresponding to that of a pulse of the clock signal.

The average value of the digital signal combination at the output 51 will then be $$\frac{857 \times 17377 + 17351}{858} = \frac{14909440}{858} = \frac{227,5 \times 2^{16}}{858} =$$

$$\frac{227,5 f_{H_o} \cdot 2^{16}}{858 f_{H_o}} = \frac{f_{so}}{nf_{H_o}} \cdot 2^{16}$$

Since the most significant bit as the first bit behind the comma, that is to say, as the power −1 of two is applied to the first divider circuit 47, this value must be divided by $2^{16}$ so as to obtain the value at the input 73 of the first divider circuit 47. This average value thus becomes the desired value $$\frac{f_{so}}{nf_{H_o}}.$$

The maximum deviation which occurs periodically is 0.143 degree.

In FIG. 3 corresponding components have the same reference numerals as those in the previous Figures. This Figure differs from FIG. 1 in that a second divider circuit 121 is provided and in that the coupling correction circuit 41 has only four inputs 43, 49, 61, 67 and two outputs 39, 59.

A first input 123 of the second divider circuit 121 is connected to the control signal output 71 of the color synchronizing signal phase detection circuit 9 and receives the digital signal combination of the value $$\frac{f_s}{f_c}$$

A second input 125 of the second divider circuit 121 is connected to the output 51 of the standard signal generating circuit 53 and receives the digital signal combination of the value $$\frac{f_{so}}{nf_{H_o}}.$$

An output 127 of the second divider circuit 121 is connected to the fourth input 67 of the coupling correction circuit 41 and applies the digital signal combination of the value $$\frac{f_s}{f_c} : \frac{f_s}{nf_{H_0}} = \frac{nf_{H_0}}{f_c}$$

to this input.

As in FIG. 1, the first digital oscillator 15 is controlled by the color synchronizing signal phase detection circuit 9 and the second digital oscillator 29 is controlled by the line synchronizing signal phase detection circuit 65 in the shown state of the coupling correction circuit 41. In the non-shown state of the coupling correction circuit 41 the first digital oscillator 15 is not controlled and the second digital oscillator 29 is controlled by the color synchronizing signal phase detection circuit 9, as was also the case in FIG. 1.

If the stable state detection circuit 85 is formed in such a way that it supplies a signal from its output 83 with an amplitude depending on the extent of frequency stability of the output signal of the line synchronizing signal phase detection circuit 65, the change-over switches of the coupling correction circuit 41 can be replaced by potentiometer circuits an example of which is shown in FIG. 4.

In the coupling correction circuit 41 of FIG. 4 the first and third inputs 43 and 61 are connected to first inputs 131 and 133 of first and second subtractor circuits 135 and 137, respectively, and to first inputs 139 and 141 of third and fourth subtractor circuits 143 and 145, respectively, outputs 147 and 149 of which are connected to the first and second outputs 39 and 59, respectively, of the coupling correction circuit 41. The second and fourth inputs 49 and 67 of the coupling correction circuit 41 are connected to second inputs 151 and 153 of the first and second subtractor circuits 135 and 137, respectively, outputs 155 and 157 of which are connected to inputs 158 and 160 of multipliers 159 and 161, respectively. Further inputs 163 and 165 of the multipliers 159 and 161, respectively, are connected to the operation signal input 81, and outputs 167 and 169 are connected to second inputs 171 and 173 of the third and fourth subtractor circuits 143 and 145, respectively.

If the amplitude of the signal is equal to P at the first input 43 and Q at the second input 49 and if the amplitude of the operation signal at the operation signal input 81 is equal to k, the signal at the output 39 has an amplitude $P-k(P-Q)=kQ+(1-k)P$. For $k=0$ this is P and for $k=1$ this is Q, for intermediate values of k this is a value which corresponds to a value supplied by a potentiometer.

If the inputs 131, 151 and 133, 153 of the first and second subtractor circuits 135 and 137, respectively, are interchanged, the third and fourth subtractor circuits 143 and 145, respectively, may become adder circuits.

In a manner corresponding to that indicated with reference to FIG. 2 the average value of the digital number to be supplied by the standard signal generating circuit 53 at its output 51 can, for example, be calculated as follows for a PAL decoding circuit for which $n=864$ and $f_{s_0}=283.7516\,f_{H_0}$:

$$\frac{f_{s_0}}{nf_{H_0}} =$$

$$\frac{283{,}7516\,f_{H_0}}{864\,f_{H_0}} =$$

$$\frac{283.7516}{864} =$$

$$\frac{625 \times 283{,}7516}{625 \times 864} =$$

$$\frac{709379}{625 \times 864} \cdot 2^{-2} =$$

$$\frac{46489862144}{625 \times 864} \cdot 2^{-18} =$$

$$\frac{621(860 \times 86092 + 4 \times 86165) + 4(860 \times 86092 + 3 \times 86165 + 86076)}{625 \times 864} \cdot 2^{-18}$$

This means that per picture period during 621 line periods the number $86092 \times 2^{-18}$ must be supplied as long as 860 clock periods and the number $86165 \times 2^{-18}$ as long as 4 clock periods, and during 4 line periods the number $86092 \times 2^{-18}$ must be supplied as long as 860 clock periods, the number $86165 \times 2^{-18}$ as long as three clock periods and the number $86076 \times 2^{-18}$ as long as one clock period, in which $86092 \times 2^{-18} = 010101\ 0000\ 01001100$ $86165 \times 2^{-18} = 010101\ 0000\ 10010101$ $86076 \times 2^{-18} = 010101\ 0000\ 00111100$ The maximum deviation which then occurs periodically is 0.12 degree.

What is claimed is:

1. A color television signal decoding circuit comprising an analog-to-digital converter (3) having an input (1) for a video signal and an output (5) which is coupled to a first input (7) of a color synchronizing signal phase detection circuit (9) a second input (11) of which is coupled to an output (13) of a first digital oscillator (15) having a clock signal input (17) which, likewise as a clock signal input (19) of the analog-to-digital converter, is coupled to an output (27) of a second digital oscillator (29) which is controllable by means of a clock signal ($f_c$) having a stable frequency, a control signal input (37) of the first digital oscillator (15) being coupled to a control signal output (71) of the color synchronizing signal phase detection circuit, a control signal input (55) of the second digital oscillator (29) being coupled to a control signal output (63) of a line synchronizing signal phase detection circuit (65) which is also coupled (via 41) to the control signal input (37) of the first digital oscillator (15), and inputs (99, 97) of the line synchronizing signal phase detection circuit (65) being coupled to outputs (5, 27) of the analog-to-digital converter (3) and of the second digital oscillator (29) for receiving signals at the line frequency of the video signal, characterized in that the control signal output (63) of the line synchronizing signal phase detection circuit (65) is coupled to an input (87) of a stable state detection circuit (85) for detecting a stable synchronization state, said stable state detection circuit (85) having an output (83) which is coupled to an operation signal input (81) of a coupling correction circuit (41) for realizing, in the stable synchronization state, a coupling between the control signal output (71) of the color synchronizing signal phase detection circuit (9) and the control signal input (55) of the second digital oscillator (29) and a coupling between the control signal input (37) of the first digital oscillator (15) and an output (51) of a standard signal generating circuit (53), and for realizing a decoupling between the control signal output (63) of the line synchronizing signal phase detection circuit (65) and the control signal inputs (37, 55) of the first and the second digital oscillator.

2. A color television signal decoding circuit as claimed in claim 1, characterized in that the coupling correction circuit (41) has a first output (39) which can be connected to a first input (43) or a second input (49) of the coupling correction circuit and a second output (59) which can be connected to a third input (65) or a fourth input (67) of the coupling correction circuit (41), said first and second outputs being coupled to the control signal inputs (37, 55) of the first and second digital oscillators (15 and 29, respectively), the first input (43) of the coupling correction circuit (41) being coupled to an output (45) of a first divider circuit (47) which has a first input (69) which is coupled to the control signal output (71) of the color synchronizing signal phase detection circuit (9) and a second input (73) which is coupled to the control signal output (63) of the line synchronizing signal phase detection circuit, the second input (49) of the coupling correction circuit (41) being coupled to the output (51) of the standard signal generating circuit (53), the third input (61) of the coupling correction circuit being coupled to the control signal output (63) of the line synchronizing signal phase detection circuit (65) and the fourth input (67) of the coupling correction circuit (41) being coupled to an output (127) of a second divider circuit (121) a first input (123) of which is coupled to the control signal output (71) of the color scynchronizing signal phase detection circuit (9) and a second input (125) of which is coupled to the output (51) of the standard signal generating circuit (53).

3. A color television signal decoding circuit as claimed in claim 2, characterized in that potentiometer circuits (135, 159, 143 and 137, 161, 145), which can be operated by the operation signal to be applied to the operation signal input (81), are incorporated in the coupling correction circuit between the first and the second input (43, 49) and the first output (39) and between the third and the fourth input (61, 67) and the second output (59), respectively.

4. A color television signal decoding circuit as claimed in claim 1, 2 or 3, characterized in that the standard signal generating circuit comprises a circuit for obtaining at its first output (51) a standard signal from the clock signal ($nf_H$) of the analog-to-digital converter (3) and the first digital oscillator (15).

* * * * *